POTTS & YOST.
Wheel-Cultivator.
No. 47,332.
Patented Apr. 18, 1865.
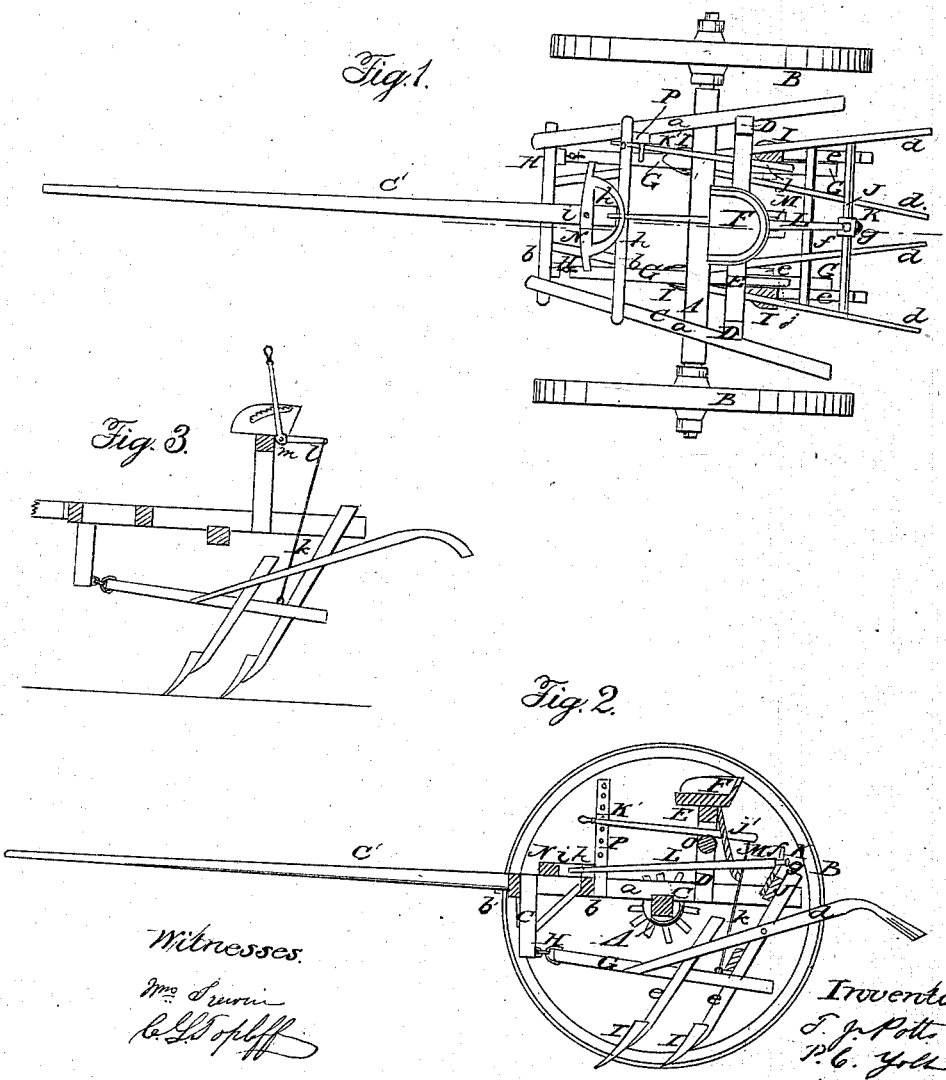

UNITED STATES PATENT OFFICE.

T. J. POTTS AND P. C. YOST, OF HAMILTON, ILLINOIS.

IMPROVED CULTIVATOR.

Specification forming part of Letters Patent No. 47,332, dated April 18, 1865.

*To all whom it may concern:*

Be it known that we, T. J. POTTS and P. C. YOST, of Hamilton, in the county of Hancock and State of Illinois, have invented a new and Improved Cultivator; and we do hereby declare that the following is a full, clear, and exact description thereof, which will enable those skilled in the art to make and use the same, reference being had to the accompanying drawings, forming part of this specification, in which—

Figure 1 is a plan or top view of our invention; Fig. 2, a side sectional view of the same, taken in the line $x\ x$, Fig. 1; Fig. 3, a view of a modification of the same.

Similar letters of reference indicate corresponding parts.

This invention relates to a new and improved cultivator of that class in which the driver may ride upon the machine and operate or adjust the plows; and the invention consists in the means employed for operating the plows, whereby it is believed that a simple and efficient cultivator is obtained, and one which may be operated with the greatest facility and possess no parts which are liable to get out of repair.

A represents an axle, which has a wheel, B, on each end of it; and C is a frame secured to the axle, composed of two oblique bars, $a\ a$, connected at their front ends by bars $b\ b$, with a draft-pole, C', attached. The frame C has an upright, D, attached to each side of it, and these uprights are connected near their upper ends by a bar, E, on the center of which the driver's seat F is secured.

G G are two plow-beams, the front ends of which are connected by universal joints H to pendants $c$, attached to the front cross-bar, $b$, of the frame C. These beams G have handles $d$ attached to them, and also standards $c$, two to each beam, with plows I secured to their lower ends. The rear standards, $e$, of the beams G G are connected by a bar, J, having a vertical metal plate, K, attached to its center, said plate having a vertical slot, $f$, made in it, in which a pin, $g$, at the rear of a lever, L, is fitted, said lever having its fulcrum in a slotted bar, M, which extends down obliquely from the bar E at its center. The front end of the lever L is fitted between two prongs, $h\ h$, on a foot-lever, N, secured by a fulcrum-pin, $i$, at the rear part of the draft-pole C'. (See Fig. 1.) By actuating the lever N, which is done by the feet of the driver, the plow-beams G G are moved laterally, either to the right or left, and the plows made to conform to the sinuosities of the rows of plants. This movement of the plows may be made with the greatest facility on the part of the driver.

Between the uprights D D, below the bar E, there is a rock-shaft, O, having two arms, $j\ j'$, secured to it, which arms are connected by rods $k\ k$ to the beams G G. One of these arms, $j$, extends forward, and is made to serve as a lever for the purpose of operating or adjusting the rock-shaft and raising or lowering the plows, the lever $j'$ being held at any desired point by pins $k'$ in an upright bar, P. This method of raising and lowering the plows, however, may be modified by having the rods $k$ attached to cranks $l$ on a shaft, $m$, as shown in red in Fig. 3. Either of these devices will answer for raising and lowering the plows and securing them at any desired height.

Having thus described our invention, we claim as new and desire to secure by Letters Patent—

The lever L, fitted in the slotted bar M, and connected at its rear to a cross-bar, J, attached to the standards $e$ at the rear of each beam, the front end of said lever being fitted between the prongs $h\ h$ of a foot-lever, N, and all arranged to operate in the manner substantially as and for the purpose set forth.

T. J. POTTS.
P. C. YOST.

Witnesses:
THOS. DOWLING,
JAMES TOLMAN.